(12) United States Patent
Malone et al.

(10) Patent No.: US 7,874,318 B2
(45) Date of Patent: Jan. 25, 2011

(54) PLUMBING TEST CAP WITH PIVOTAL LATCH

(75) Inventors: David S. Malone, Attica, MI (US); Michael J. Andre, Keego Harbor, MI (US); Wayne Harper, Macomb Township, MI (US)

(73) Assignee: Brass Craft Manufacturing Company, Novi, MI (US)

( * ) Notice: Subject to any disclaimer, the term of this patent is extended or adjusted under 35 U.S.C. 154(b) by 0 days.

(21) Appl. No.: 12/294,059

(22) PCT Filed: Mar. 23, 2007

(86) PCT No.: PCT/US2007/064818

§ 371 (c)(1),
(2), (4) Date: Apr. 16, 2009

(87) PCT Pub. No.: WO2007/109795

PCT Pub. Date: Sep. 27, 2007

(65) Prior Publication Data

US 2009/0188577 A1   Jul. 30, 2009

(51) Int. Cl.
*F16L 55/10* (2006.01)

(52) U.S. Cl. .................. 138/89; 138/89.1; 138/89.2; 220/839; 220/315; 220/319; 220/375

(58) Field of Classification Search .............. 138/90, 138/89; 285/33; 215/274; 220/320, 324, 220/839, 315, 319, 375
See application file for complete search history.

(56) References Cited

U.S. PATENT DOCUMENTS

| 4,176,756 A | * | 12/1979 | Gellman ............... 215/274 |
| 4,241,188 A | * | 12/1980 | Materia et al. ......... 435/304.1 |
| 4,286,640 A | * | 9/1981 | Knox et al. ............ 604/404 |
| 4,326,740 A | | 4/1982 | Guiler ................. 292/307 B |
| 4,377,245 A | * | 3/1983 | Patty .................. 220/822 |
| 4,457,445 A | * | 7/1984 | Hanks et al. ........... 220/214 |
| 6,935,380 B2 | | 9/2005 | Rahimzadeh et al. ..... 38/96 R |

OTHER PUBLICATIONS

International Search Report PCT/US07/64818.

* cited by examiner

*Primary Examiner*—Patrick F Brinson
(74) *Attorney, Agent, or Firm*—Carlson, Gaskey & Olds, PC

(57) ABSTRACT

A plumbing test cap has a body with a bore extending from a first end which is mountable over a stub-out having a surface engagement feature. The body has a closed second end. A retainer is carried on the body for transverse movement from a first position allowing movement of the body relative to the stub-out and a second position in which the retainer is locked to the body, in turn locking the body on the stub-out.

6 Claims, 5 Drawing Sheets

PLUMBING TEST CAP WITH PIVOTAL LATCH

BACKGROUND

The present disclosure relates, in general, to fluid couplings used to fluidically couple one or more fluid components together and, more specifically, to test caps used in building plumbing.

In plumbing, copper pipes are mounted within the building walls, floor, and/or ceiling and connect a water supply source to each individual fluid discharge outlet, such as toilets, sinks, tubs, showers, etc.

During construction of a building or home, the pipes are fluidically connected or soldered in fixed locations within the building walls. An extension known as a "stub out" is connected to the wall-mounted pipes and projects laterally from the pipes outward from a wall where a discharge outlet is to be provided to a sink, toilet, tub, etc.

Building codes require that the entire plumbing system be checked for leaks. This is accomplished by sweating or brazing test caps on each stub out at the completion of the rough plumbing stage to enable to entire plumbing system to be pressurized.

After successful completion of the pressurize test, the test caps are removed from each stub out, typically by cutting the test caps off of the stub out or applying heat to vaporize the solder to enable removal of the test caps. The individual plumbing fixtures are then be attached to each stub out in a known manner.

The use of such test caps is time consuming, which adds to the overall plumbing cost material and installation for a building or home. Although a skilled plumber can quickly braze a test cap onto a stub out and/or remove the same test cap from the stub out, the number of stub outs in a typically building or home makes this a time consuming and therefore costly task.

It would be desirable to provide a new fluid connection which simplifies and reduces the cost of mounting and removing test caps on building and home plumbing systems.

SUMMARY

A fluid coupling includes a plumbing test cap mountable on a tubular conduit stub out which has a surface engagement feature. The test cap includes a body having a bore extending from a first open end to a closed second end. A retainer is unitarily carried on the body for pivotal transverse movement from a first position spaced from the body allowing movement of the body relative to the stub out, and a second position wherein the retainer is locked to the body, in turn locking the body on the stub out.

The retainer includes a surface engagement member which is lockingly engagable with the surface engagement feature of the stub out.

In anther aspect, lock members lock the retainer to the body in the second position. A frangible portion is formed on and separable from the body to enable disengagement of the retainer from the lock members and separation of the test cap from the stub out.

The plumbing test cap with pivotal latch disclosed herein simplifies and reduces the cost of mounting and removing test caps on building and home plumbing systems. The present test cap is quickly and easily mountable on a stub out and lockingly attachable to the stub out in a sealed position to enable the system pressure test to be completed. This eliminates the time previously involved in sweating or braising a test cap onto each stub out in a home or building and then applying heat to the test cap to remove the test cap from each stub out after the pressure test has been successfully completed. The present test cap provides a simple latch and unlatch means for attaching and removing the test cap from the stub out thereby reducing time and plumbing system, installation costs.

BRIEF DESCRIPTION OF THE DRAWING

The various features, advantages and other uses of the disclosed test cap will become more apparent by referring to the following detailed description and drawing is which.

DETAILED DESCRIPTION

Figure 1:
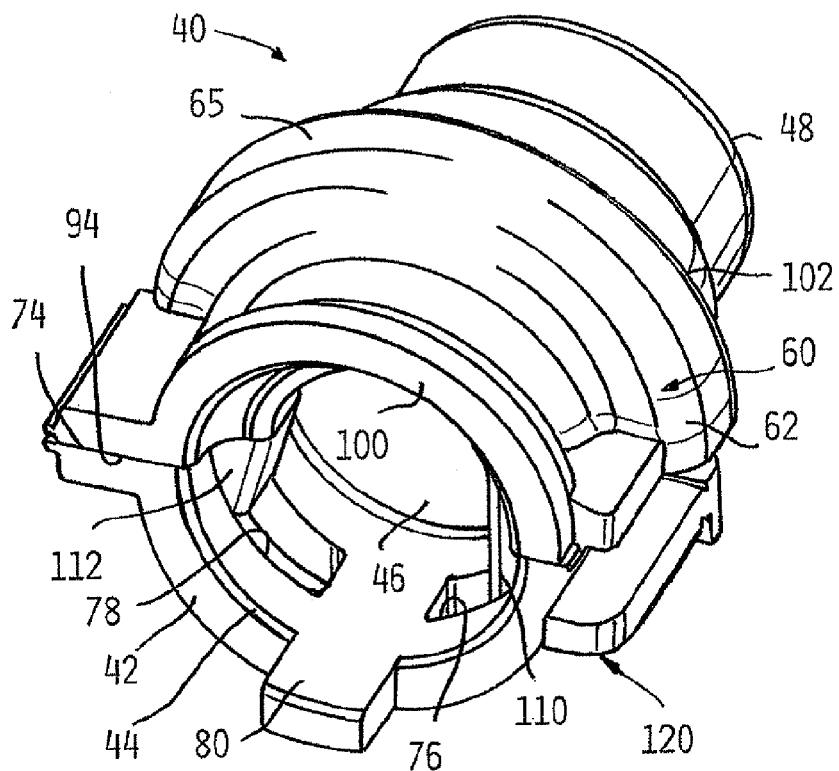
FIG. 1 is a perspective view of a plumbing test cap with pivotal latch shown in the closed position.

Referring to FIGS. 1-4 of the drawing, there is disclosed one aspect of fluid coupling including a plumbing test cap 20 useful in temporarily fixed mounting over an end of a stub out 22 projecting laterally outward from a building or home plumbing system, not shown.

By way of example only, the stub out 22 is typically in the form of a tubular member, such as a pipe. An end form 23 on the stub out 22 includes a tip portion 26 with a tip end 24. A surface engagement feature 28 is formed in the end form 22 at a position spaced from the tip end 24. Although the surface engagement feature 28, in one example, is depicted as being an annular recess or groove formed in the end form 23, it will be understood that the surface engagement feature 28 may also be a raised bead or flange projecting radially outward from the exterior surface of the end form 23.

A bore 30 is formed in the stub out 22 and extends from the end of the stub out 22 connected to the building plumbing system, not shown, to an open outlet or aperture 32 at the tip end 24.

The fluid coupling includes a housing or body 40 typically formed of a one-piece, molded or formed plastic. The body 40 extends from a first end 42 having an aperture 44 formed therein fluidically coupled to a bore 46 extending from the first end 42 to an opposed second end 48. Although in certain applications, the housing 40 could be designed for fluid flow completely through the aperture 44 in the first end 42 through an aperture 44 in the second end 48, the body 40 shown in FIGS. 1-4 has the second end 48 closed to enable use of the body 40 as a test cap for a building or home plumbing system pressure test.

The bore 46 may have a stepped configuration formed of different diameter, sections or portions. In one portion of the bore 46, seal elements shown, by example only, as a pair of spaced resilient O-rings 50 and an intermediately disposed rigid spacer 52, are held in the bore 46 by means of a sleeve-like top hat 54 which is press fit or otherwise fixed in the bore 46.

The seal members 50 and 52 and the top hat 54 sealingly engage the top portion 26 of the end form 23 when the body 40 is mounted over the tip portion 26 of the end form 23 on the stub out 22 to sealingly couple the body 40 to the stub out 22.

A radially enlarged flange 60 is formed on the body 40 intermediate the first and second ends 42 and 44. By way of example only, the flange 60 projects only over a portion of the circumference of the body 40, such as over approximately 180° of the body 40. The flange 60 has opposed, radially extending side surfaces 62 and 64 and an outer end 65.

As shown in FIGS. 1-4, a generally hemispherical shaped collar 70 projects from a cylindrical portion of the body 40 to the first end 42 of the body 40, non-contiguous with the flange 60.

The collar 70 has a first end 72 and an opposed second end 74. By way of example, at least one and preferably a pair of transversely extending through apertures 76 and 78 are formed in the collar 70 intermediate the opposed ends 72 and 74.

An extension 80 is integrally carried on the body 40 and extends axially outward from the first end 42 of the body 40. The purpose of the extension 80 will be described in greater detail hereafter.

A retainer 90 is pivotally coupled to the body 40. In one aspect, the retainer 90 is integrally formed as a one-piece unitary part of the body 40. The retainer 90 is pivotally connected to the end 74 of the collar 70 by a hinge 92 which can be formed as a living hinge constructed of a thin cross-section portion extending between the second end 74 of the collar 70 and a first end 94 of the retainer 90. The retainer 90 has a generally hemispherical shape extending between the first end 94 to an opposed end 96. The retainer 90 has a wall 98 extending between the first and second ends 94 and 96. Opposed side edges 100 and 102 are formed on the central wall 98.

Figure 3:
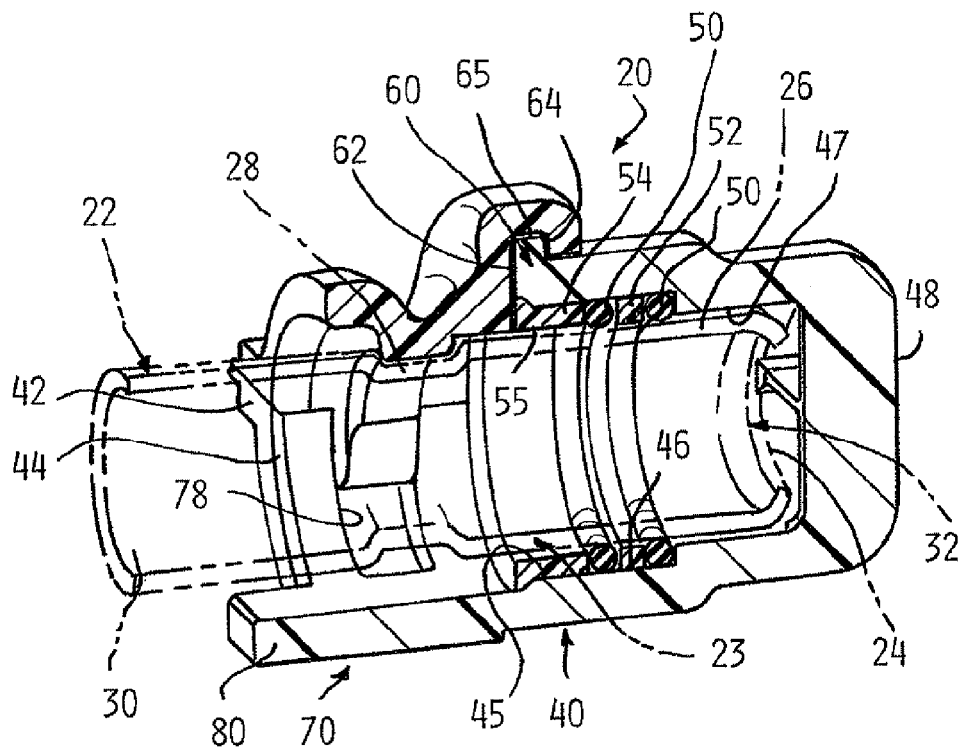
FIG. 3 is a longitudinal cross sectional view of the plumbing test cap with pivotal latch of FIG. 1.
Figure 2:
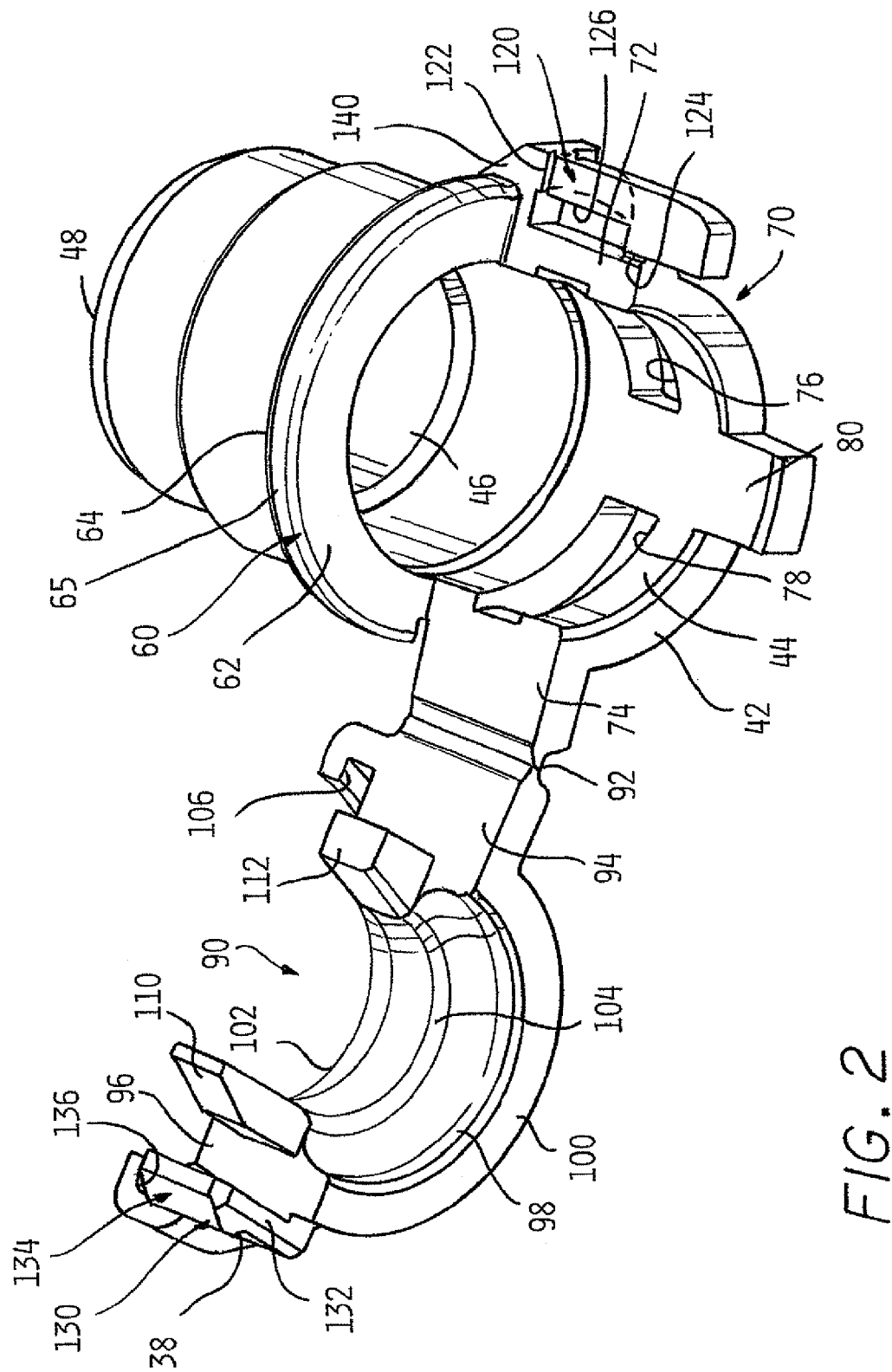
FIG. 2 is a perspective view of the plumbing test cap with pivotal latch of FIG. 1, shown in the open, unlatched position.
Figure 4:
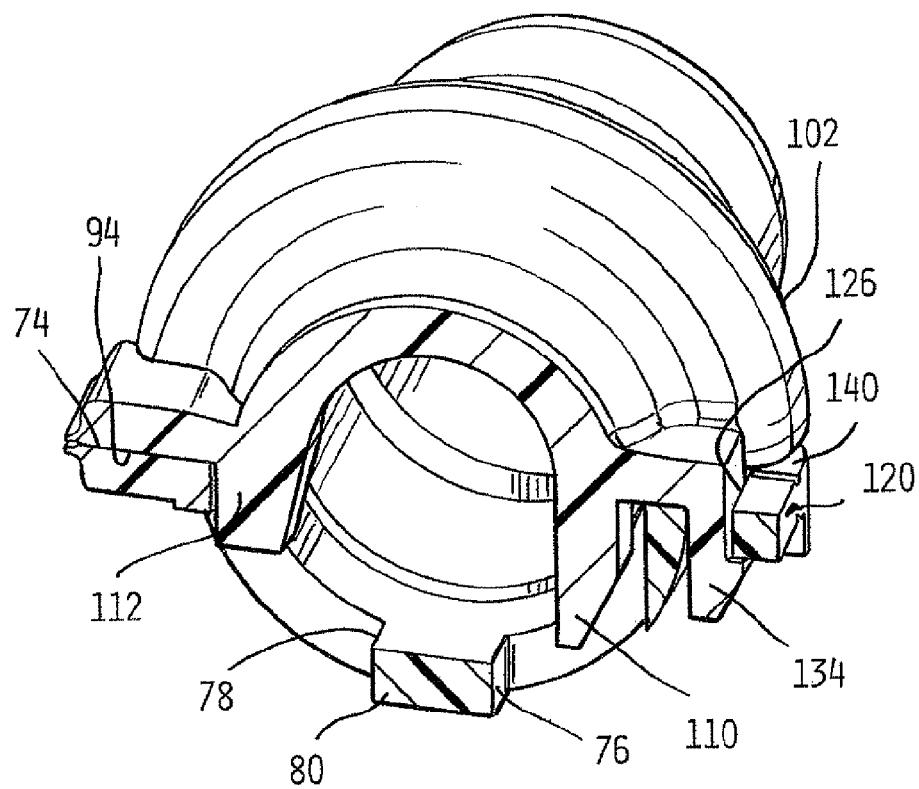
FIG. 4 is a partial perspective view of the plumbing test cap with pivotal latch shown in FIG. 1, with a portion of the end cut away for clarity of interior features.

An engagement surface 104, complementary to the surface engagement feature 28 of the end form 23 on the stub out 22, which in the illustrated aspect is a recessed groove in the end form 23, is carried on an inner surface of the end wall 98 and extends radially inward from the inner surface of the wall 98 to engage and lock within the groove 28 on the end form 23 when the retainer 90 is moved from a first open position shown in FIG. 2 wherein the body 40 is movable relative to the end form 23 of the stub out 22 and a second latched position shown in FIGS. 1, 3 and 4 in which the retainer 90 is pivoted to a position in which the ends 94 and 96 are in overlaying relationship with the ends 72 and 74 of the collar 70.

Additional pull out force resisting separation of the body 40 from the stub out 22 is provided by an annular recess 106 formed in the wall 98 between the first end 94 and the second end 96. The recess 106 is sized to fit over the side surfaces 62 and 64 and the outer end wall 65 of the flange 60 on the body 40 as shown in FIGS. 1, 3 and 4.

A pair of arms 110 and 112 are carried on an inner surface of the wall 98 of the retainer 90 and extend generally axially from the ends 94 and 96 of the retainer 90. The arms 110 and 112 are adapted to fit within the apertures 76 and 78, respectively, in the collar 70 of the body 40 when the retainer 90 is moved to the second latched position. The engagement of the arms 110 and 112 in the apertures 75 and 78 resists axial movement of the retainer 90 relative to the stub out 22.

Lock members are carried on the retainer 90 and the body 40 for locking the retainer 90 in the second latched position. The lock members also provide a release or unlock function as described hereafter.

The lock members include a flange 120 integrally molded as part of the body 40 and generally extending axially from a wall 140 on the body 40 along the first end 72 of the collar 70. The flange 120 is frangibly coupled to the body 40 by at least one or more recesses or score lines 122 and 124. The recesses 122 and 124 provide a twist-off frangible capability to the flange 120 and a one-time use feature for the body 40 by enabling the flange 120 to be separated, along one or more of the recesses 122 and 124, from the remainder of the body 40 to permit the retainer 90 to be disengaged from the latched second position and moved to the first position enabling separation of the body 40 from the stub out 22. Due to the frangible nature of the flange 120, after it has been separated from the body 40 on at least one of the recesses 122 and 124 from the body 40, the retainer 90 can no longer be latched to the body 40, thereby enabling only one-time use of the body 40.

An aperture 126 formed in the flange 120 receives a latch member 130 carried on the retainer 90 adjacent the second end 96. The latch member 130 is in a form of a leg 132 extending unitarily from the second end 96 of the retainer 90. The leg 132 terminates in an enlarged or hook-shaped end 134 having a tapered insertion surface 136 and a engagement surface 138.

The largest dimension of the end 134 of the latch member 130 is greater than the width of the aperture 126 formed in the flange 120. This requires the thin leg of the flange 120 to deform outward enlarging the aperture 126 to enable to enlarged end 134 of the latch member 130 to pass therethrough until the latch engagement surface 138 snaps beyond and into engagement with the under side of the flange 120, to lock the retainer 90 in the second latched position.

To disengage the body 40 from the stub out 22, a twisting force is applied to the flange 120 to separate it from the body 40 along one or both of the recesses 122 and 124. This frees the enlarged end 134 of the latch member 130 from the aperture 126 in the flange 120 allowing the retainer 90 to be pivoted to the first open position shown in FIG. 2 for disengagement of the body 40 from the end form 23 on the stub out 22.

As shown in FIG. 3, a plurality of bearing surfaces support the body 40 on the end form 23 of the stub out 22. The bearing surfaces include an inner surface of the smallest diameter bore portion 47 of the bore 46, an inner surface 55 of the top hat 54, inner surfaces of the seal members 50 and 52 and an end portion 45 of an intermediate diameter portion of the bore 46 adjacent to the flange 60, the surface engagement feature 28 of the end form 23 in the body 40 as well as the extension 80 of the body 40 which engages a larger diameter portion of the stub out 22 spaced from the surface engagement feature 28. These bearing surfaces co-operate to stably fix the body 40 on the stub out 22.

Figure 8:
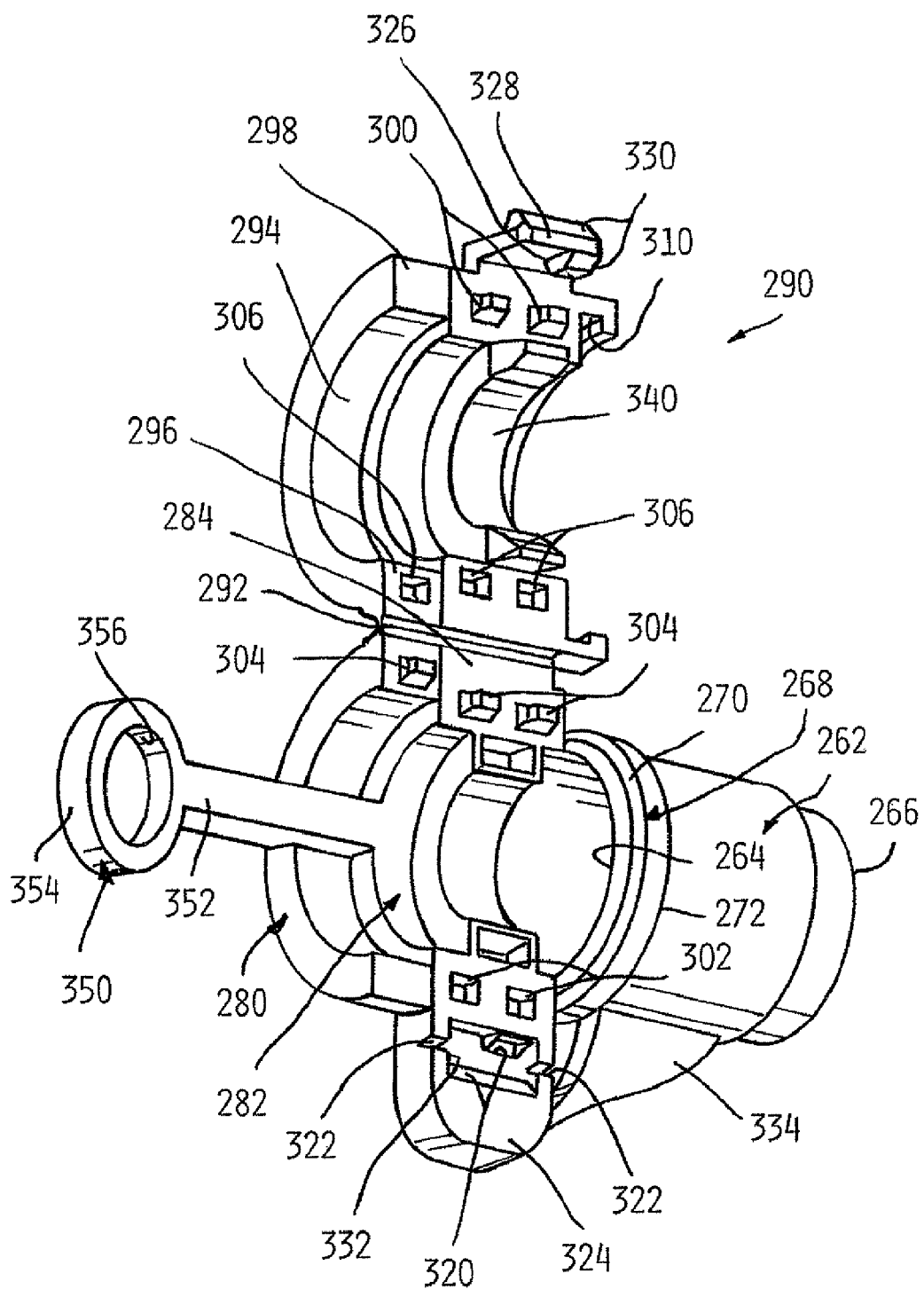
FIG. 8 is a perspective view of another aspect of a plumbing test cap with pivotal latch.

As shown in another aspect the extension 80 may have an elongated flexible clip, shown in FIG. 8, formed thereon which has an enlarged end with an aperture sized to snuggly fit over the enlarged diameter portion of the stub out 22. In the event of movement of the body away from the stub out 22, the enlarged end of the clip will function as a lock by movement of the enlarged end at a angle with respect to the outer surface of the stub out 22 locking the clip and thereby the body 40 to the stub out 22.

In normal practice, after the body 40 is latched to the end form 23 of the stub out 22, a plumbing pressure test is conducted. At the completion of a successful pressure test, it is not uncommon for the drywall to be installed over the body 40 on each stub out 22 prior to removal of the body or test cap 40. Frequently, the drywall is forcibly urged over the body 40 by pressure applied to the drywall 40. To prevent damage to the latch flange 120, the wall 140 acts as a protective surface enabling the drywall to move over the body 40 without contacting the latch flange 120.

Alternately, although not shown in FIG. 8, outwardly tapered wings or ribs may be formed on the body 40 which terminate in an outer end having a diameter larger than the outermost edge of the latch flange 120 to protect the latch flange 120 from damage in the event that drywall is forcibly urged over the body 40 latched on a stub out 22.

Figure 5:
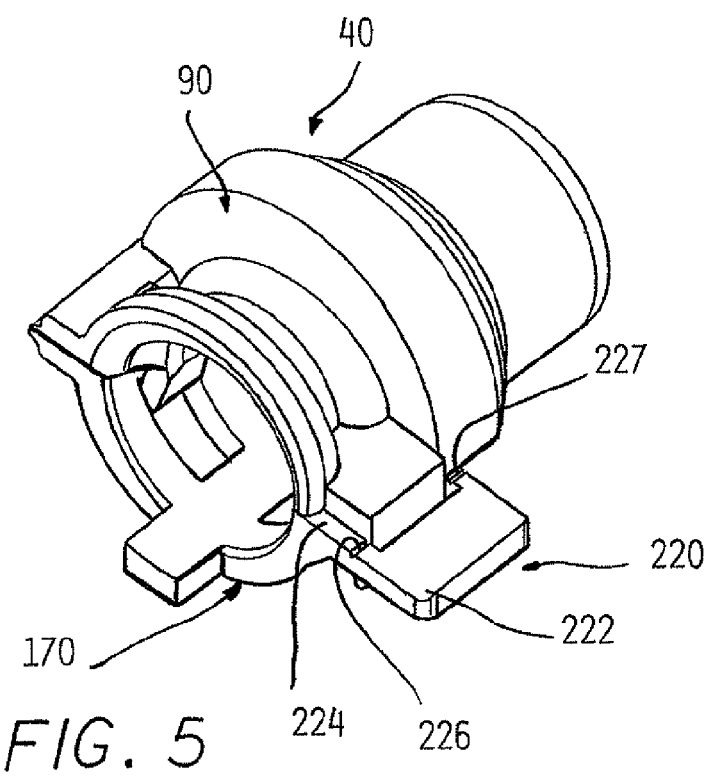
FIG. 5 is a perspective view of another aspect of a plumbing test cap with pivotal latch shown in the closed position.
Figure 6:
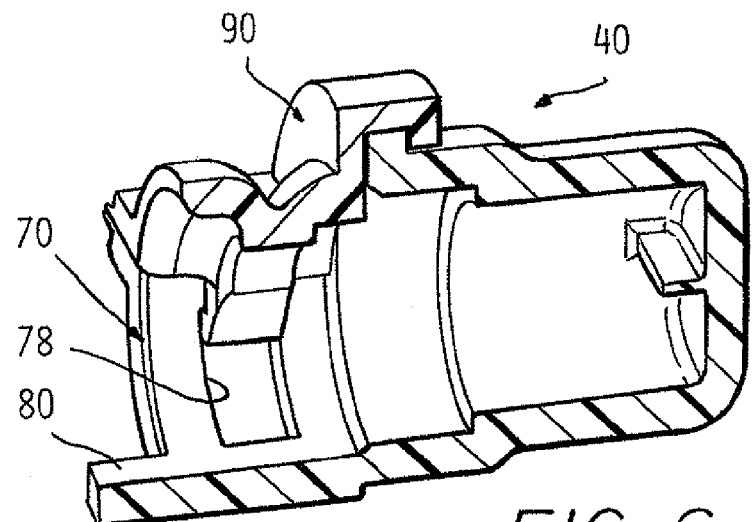
FIG. 6 is longitudinal cross sectional view of the plumbing test cap with pivotal latch as shown in FIG. 5.
Figure 7:
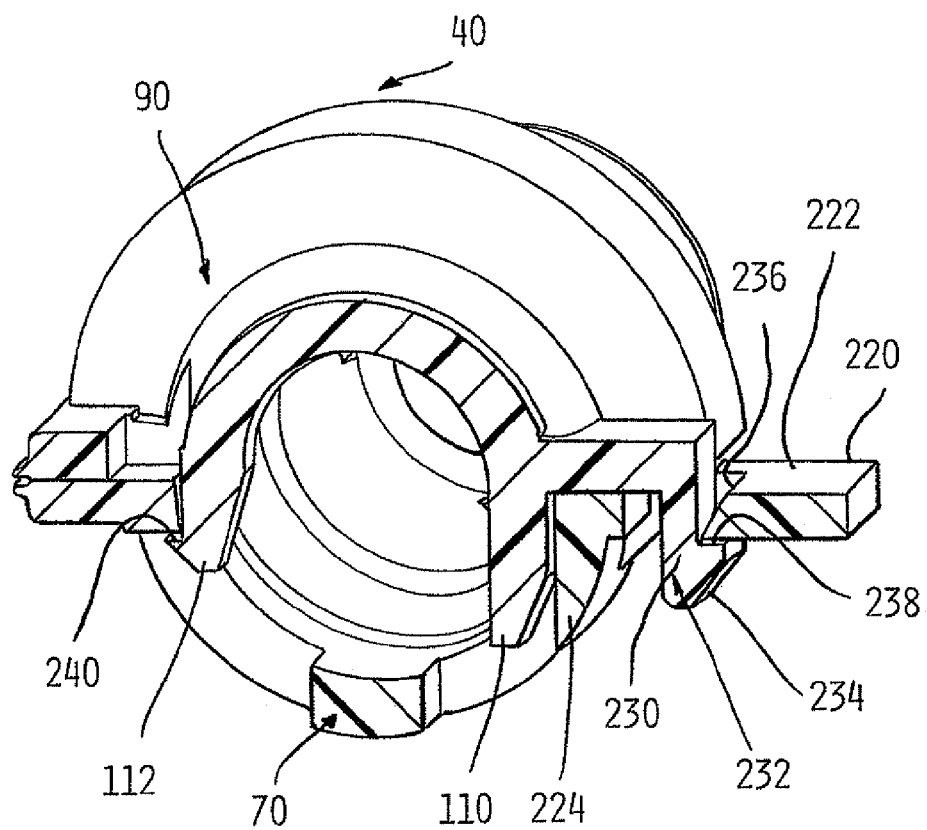
FIG. 7 is a perspective view of the plumbing test cap with pivotal latch shown in FIGS. 5 and 6 with the end portion cut away to show interior features.

Referring now to FIGS. 5-7, there is depicted another aspect of the present invention which utilizes the same body 40. Only the orientation and construction of the latch flange differs from that described and shown above and shown in FIGS. 1-4.

Thus, only the modifications or different features shown in FIGS. 5-7 from that shown in FIGS. 1-4 will be described hereafter.

In this aspect, a latch flange 220 extends radially outward from one end of the collar 170. The latch flange 220 includes an outer pad 222 and an aperture 224 formed between the outer pad 222 and an inner pad 224. A recess or score line 226 and 227 is formed in each outer leg connecting of the pads 222 and 224 to provide a twist-off, frangible feature to the latch flange 220 when it is desired to disengage the body 40 from the stub out 222.

The retainer 90, in this aspect, has a radially outward extending arm structure 230 which has an enlarged, hook shaped end 232. The end 232 includes a ramp-shaped insertion surface 234 which is adapted to slide along a complementary inclined ramp surface 236 in one edge of the outer pad 222 bounding the aperture 224 and an engagement surface 236. When the retainer 90 is moved from the first unlatched position to the second latched position shown in FIGS. 5-7, the enlarged end 232 will engage and bend radially inward due to the engagement of the ramp surfaces 234 and 236 until the engagement surface 238 snaps radially outward underneath the outer pad 224 latching the retainer 90 in the second position to the body 40.

When it is desired to separated the body or test cap 40 from the stub out 22, force is applied to the outer pad 222 breaking the outer pad 222 along at least one of the score lines 226 and 227 to allow movement of the retainer 90 relative to the body 40 back to the first unlatched position.

An angular ramp or wall may be formed on the body 40 between the second end of the body 40 and one side edge of latch flange 220 to protect the latch flange 220 from damage if a sheet of drywall is forced over the body 40 when the body 40 is latched on a stub out 23.

FIG. 7 also depicts modification to one or both of the inner arms, such as arm 112, on the retainer 90. A hook-shape engagement surface may be formed on the end of at least one of the arms, such as arm 112, to latch under the adjoining portion of the collar 70 when the retainer 90 is in the second latched position as shown in FIG. 7.

Referring now to FIG. 8, there is depicted another aspect of a fluid coupling which can be used as a plumbing test cap. The fluid coupling or test cap 260 includes a body 262 substantially identical to the body 40. One end 264 of the body 262 may be open and an opposed second end closed by a solid wall 266. Alternately, the second end 266 may also have an opening for connection to other fluid carrying components.

The body 262 has a bore extending from the first opening 264. Seal elements, not shown, similar to the seal elements 50, 52 described above and shown in FIG. 3, can be mounted in the bore.

A radially enlarged flange 268 with opposed side surfaces 270, 272 is formed on the body 262 at the first end.

A generally hemispherical-shaped collar 280 projects axially from one portion of the first side surface 270 of the flange 268. The collar 280 has a first end 282 and an opposed second end 284.

A retainer 290 is pivotally coupled to the second end 284 of the collar 280. As described above, the retainer 290 can be integrally formed as a one-piece, unitary part of the body 262. The retainer 290 can thus be pivotally coupled to the body 262 by means of a thin living hinge 292. The hinge 292 enables the retainer 290 to transversely pivot from a first open position shown in FIG. 8 in which the body 262 may be freely moved relative to a fixed stub-out or conduit, to a second position, similar to the second latched positions of the previously described retainers to latch the body 262 to the stub-out or conduit.

The retainer 290 includes a wall 294 which extends generally hemispherically between a first end 296 and an opposed second end 298.

One or more pairs of complimentary-shaped strengthening ribs and recesses or through-bores are formed in the first and second ends 282 and 284 of the collar 280 and the first and second ends 296 and 298 of the retainer 90. For example, the ribs and recesses may be formed on ends of the collar 280 and the retainer 290 to provide added pull-out force resistance to separation of the body 262 from any stub-out or conduit.

For example, a pair of ribs 300 are formed in and project outward from the second end 298 of the retainer 290. The ribs 300 engage recesses or bores 302 formed in the first end 282 of the collar 280 when the retainer 290 is pivoted to the second latched position. Similarly, at least one rib 302, with three ribs 304 being shown by way of example only, are formed in and project outward from the second end 284 of the collar 280 and engage complementary shaped and positioned recesses 306 on the first end 283 of the collar 280.

The retainer 290 also includes a generally annular recess 310 which is sized and shaped to fit over the flange 268 on the body 262 when the retainer 290 is pivoted to the second latched position on the body 262. The engagement of the recess 310 and the flange 268 provides added pull-out force resistance to prevent inadvertent separation of the body 262 from any attached stub out or conduit.

Interconnectible lock members are carried on the retainer 290 and the collar 280 for locking the retainer 290 to the collar 280 in the second latched position. The lock members include at least one, or a pair, of oppositely extending projections 320 formed in a bore 322 in a twist-off, release pad 324 extending radially outward from the first end 282 of the collar 280. The projections 320 engage oppositely extending hook members 326 and 328, respectively carried on a leg 330 of the retainer 290 as the retainer 290 is pivoted to the second latched position.

Disengagement of the body 262 from the stub out is accomplished by a twisting force applied to the release pad 324. At least one or more recessed score lines 332 and 334 extend inward from one surface of the pad 324. A twisting force applied to the pad 324 will separate the outer end of the pad 324 from the body 262 and the first end 282 of the collar. This releases the hooks 326 and 328 on the retainer 290 allowing pivotal movement of the retainer 290 from the second position shown in FIG. 8 and separation and disengagement of the body 262 from a stub out or conduit on which it was previously attached.

The separation of the end of the pad 324 from the remainder of the body 262 also provides a one-time use capability for the coupling or test cap 260 since the retainer 290 cannot be again latched in the second position to the pad 324 for a subsequent use of the same test cap or coupling 260.

As shown in FIG. 8 and described in other aspects, the retainer 290 includes an engagement member 340, in the form of a continuous or discontinuous arcuate, radially inward extending rib carried on an inner surface of the wall 294. The rib 340 is adapted to engage a complimentary-shaped engagement surface profile, such as the recessed groove shown in FIG. 3, in an end form portion of a stub out or conduit to lock the retainer 290 and the entire body 262 on the end form portion of the stub out or conduit.

Also shown in FIG. 8 is another aspect in which a secondary or auxiliary attachment member 350 extends axially from an outer end of the collar 280 by an elongated stem 352. An enlarged end 354 is formed at one end of the stem 352 and carries an aperture 356. In use, when the body 262 is to be coupled to a stub out or conduit, the secondary attachment member 350 is bent out of the axial plane shown in FIG. 8 to a position in which the enlarged head 354 is generally perpendicular to the stem 352. The aperture 356 in the enlarged end 354 is initially inserted over the end of the stub out and slid along the length of the stub out until the body 262 is fully inserted over the end form portion of the stub out to enable the retainer 290 to be pivoted to the second position and locked to the body 262 to fix the body 262 on the stub out or conduit.

The secondary attachment member 350 provides a retention feature to the body 262 since in the event that the body 262 is forced from the end of the stub out by an inadvertent disengagement of the retainer 290 from the second locked position, such as could be caused by a force generated by pressurized fluid in the stub out or conduit, an enlarged head 354 will pivot to an angular, non-perpendicular position with respect to a longitudinal axis extending through the stub out and forcibly to engage the exterior surface of the stub out and thereby retaining the body 262 on the stub out, even though the body 262 is no longer sealingly latched to the stub out by the retainer 290.

What is claimed is:

1. A test cap sealingly mountable on a stub out having a surface engagement feature comprising:
   a body having a bore extending from a first open end to a closed second end; and
   a retainer unitarily carried on the body for pivotal transverse movement from a first position spaced from the body and allowing movement of the body relative to the stub out, and a second position wherein the retainer is locked to the body, in turn locking the body on the stub out; and
   lock members locking the retainer to the body in the second position, wherein
   at least one of the lock members includes a frangible portion separable from the body to enable disengagement of the retainer from the lock members and separation of the test cap from the stub out.

2. The test cap of claim 1 further comprising:
   first and second seal elements disposed on opposite sides of a spacer, the seal elements and the spacer disposed in the bore and sealingly engagable with the stub out.

3. A fluid connection comprising:
   a stub out having a surface engagement feature;
   a body having a bore extending from a first open end to a closed second end;
   a retainer unitarily carried on the body for pivotal transverse movement from a first position spaced from the body and allowing movement of the body relative to the stub out, and a second position wherein the retainer is locked to the body, in turn locking the body on the stub out; and
   a first and second seal element disposed on opposite sides of a spacer, the seal elements and the spacer disposed in the bore and sealingly engagable with the stub out.

4. The fluid connection of claim 3 further comprising:
   lock members locking the retainer to the body in the second position, wherein
   at least one of the lock members includes a frangible portion separable from the body to enable disengagement of the retainer from the lock members and separation of the test cap from the stub out.

5. A test cap sealingly mountable on a stub out having a surface engagement feature comprising:
   a body having a bore extending from a first open end to a closed second end;
   a retainer unitarily carried on the body for pivotal transverse movement from a first position spaced from the body and allowing movement of the body relative to the stub out, and a second position wherein the retainer is locked to the body, in turn locking the body on the stub out;
   a surface engagement member carried on the retainer lockingly engagable with the surface engagement feature on the stub out, wherein the surface engagement feature on the stub out is a recessed groove and the surface engagement member is a radially extending rib,
   wherein the recessed groove is spaced from an end of the stub out.

6. A fluid connection comprising:
   a stub out having a surface engagement feature;
   a body having a bore extending from a first open end to a closed second end; and
   a retainer unitarily carried on the body for pivotal transverse movement from a first position spaced from the body and allowing movement of the body relative to the stub out, and a second position wherein the retainer is locked to the body, in turn locking the body on the stub out
   a surface engagement member carried on the retainer lockingly engagable with the surface engagement feature on the stub out, the surface engagement feature on the stub out a recessed groove and the surface engagement member a radially extending rib, wherein the recessed groove is spaced from an end of the stub out.

* * * * *